United States Patent
Cho et al.

(10) Patent No.: US 11,234,095 B1
(45) Date of Patent: Jan. 25, 2022

(54) ADJUSTING ACOUSTIC PARAMETERS BASED ON HEADSET POSITION

(71) Applicant: Facebook Technologies, LLC, Menlo Park, CA (US)

(72) Inventors: Sang-Ik Cho, Kirkland, WA (US); Pablo Francisco Faundez Hoffmann, Kenmore, WA (US); Karol Constantine Hatzilias, Kenmore, WA (US); Gregory Olegovic Andreev, Kirkland, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 139 days.

(21) Appl. No.: 16/880,187

(22) Filed: May 21, 2020

(51) Int. Cl.
*H04S 7/00* (2006.01)
*G06F 3/01* (2006.01)
*G06K 9/00* (2006.01)

(52) U.S. Cl.
CPC .............. *H04S 7/304* (2013.01); *G06F 3/013* (2013.01); *G06K 9/0061* (2013.01); *G06K 9/00281* (2013.01); *H04S 2420/01* (2013.01)

(58) Field of Classification Search
CPC ...... H04S 7/304; H04S 2420/01; G06F 3/013; G06K 9/00281; G06K 9/0061
See application file for complete search history.

(56) References Cited

U.S. PATENT DOCUMENTS

| | | | |
|---|---|---|---|
| 10,638,248 B1* | 4/2020 | Dodds | G10K 11/17827 |
| 10,638,252 B1* | 4/2020 | Donley | H04R 3/005 |
| 2014/0010391 A1* | 1/2014 | Ek | G06F 3/165 381/310 |
| 2014/0321680 A1* | 10/2014 | Takahashi | H04S 7/302 381/303 |
| 2017/0332186 A1* | 11/2017 | Riggs | H04S 7/301 |
| 2020/0336856 A1* | 10/2020 | Khaleghimeybodi | H04R 5/033 |
| 2020/0387341 A1* | 12/2020 | Robinson | G16H 20/30 |
| 2021/0034725 A1* | 2/2021 | Donley | G06F 21/32 |
| 2021/0176555 A1* | 6/2021 | Hoffmann | H03G 5/165 |
| 2021/0337342 A1* | 10/2021 | Schissler | H04R 5/033 |

OTHER PUBLICATIONS

Guestrin, E. D. et al. "General Theory of Remote Gaze Estimation Using the Pupil Center and Corneal Reflections." IEEE Transactions on Biomedical Engineering, vol. 53, Iss. 6, Jun. 2006, pp. 1124-1133.

* cited by examiner

*Primary Examiner* — David L Ton
(74) *Attorney, Agent, or Firm* — Fenwick & West LLP

(57) ABSTRACT

An audio system (e.g., of an artificial reality headset) determines a position of the headset relative to a position of a head of a user wearing the headset. The determination is based in part on an image of a portion of the head from a tracking camera (e.g., eye tracking and/or face tracking) on the headset. The audio system adjusts an acoustic parameter based in part on the determined position of the headset. The audio system performs an action that uses the adjusted acoustic parameter.

20 Claims, 8 Drawing Sheets

400

---

Determine a position of a headset relative to a position of a head based in part on an image of a portion of the head
410

↓

Adjust one or more audio parameters based in part on the determined position
420

↓

Perform action using the adjusted one or more audio parameters
430

FIG. 4

ADJUSTING ACOUSTIC PARAMETERS BASED ON HEADSET POSITION

FIELD OF THE INVENTION

This disclosure relates generally to generating audio content, and more specifically to adjusting acoustic parameters based on headset position.

BACKGROUND

Augmented reality glasses often are mounted on a frame, and effectiveness of the glasses is dependent on their position and orientation on a head. Techniques such as visual inertial odometry can be used to track the device-centric, world-locked position and orientation for glasses. However, it is generally difficult to assess the position and orientation of glasses relative to a wearer's head. Moreover, there is a person-to-person and fit-to-fit variation of glasses to heads of different users. This can result in reduced sensor performance on the glasses as well as inconsistent audio performance (e.g., caused by movement of the glasses on the head of the wearer).

SUMMARY

An audio system adjusts one or more acoustic parameters based on a position of a headset (e.g., head-mounted display, near-eye display, eyeglasses, etc.) on a head of a user. The audio system may be integrated into the headset. The headset may include one or more inward facing tracking cameras (e.g., oriented to capture an image of a portion of a face of the user, eye(s) of the user). The one or more tracking cameras may be part of, e.g., a tracking unit. The tracking unit may function as, e.g., an eye tracking system, a face tracking system, or some combination thereof. The one or more tracking cameras capture one or more images of respective portions of a head of the user. The audio system determines a position of the headset relative to a position of the head based in part on the one or more captured images. The audio system adjusts one or more acoustic parameters (e.g., equalization profile for the user, array transfer function for a microphone array of the headset, etc.) based in part on the determined position of the headset. The audio system performs an action that uses the one or more adjusted acoustic parameters. For example, the audio system may present audio content (e.g., via a speaker array) in accordance with the adjusted one or more acoustic parameters. In another example, the audio system applies the one or more adjusted acoustic parameters (e.g., array transfer function of a microphone array) to sound captured from the microphone array of the headset.

In some embodiments, a method for adjusting an acoustic parameter based on headset position is described. A position of a headset relative to a position of a head of a user wearing the headset is determined. The determining based in part on an image of a portion of the head (e.g., face, one or both eyes, etc.) from a tracking camera on the headset. The acoustic parameter is adjusted based in part on the determined position of the headset. The audio content is presented in accordance with the adjusted acoustic parameter.

In some embodiments, a non-transitory computer readable medium configured to store program code instructions, when executed by a processor, cause the processor to perform steps. The steps comprising: determining a position of a headset relative to a position of a head of a user wearing the headset, the determining based in part on an image of a portion of the head from a tracking camera on the headset. The steps further comprising: adjusting an acoustic parameter based in part on the determined position of the headset, and performing an action that uses the adjusted acoustic parameter.

BRIEF DESCRIPTION OF THE DRAWINGS

FIG. 4 is a flowchart illustrating a process for adjusting acoustic parameters based on headset position, in accordance with one or more embodiments.

Figure 1A:
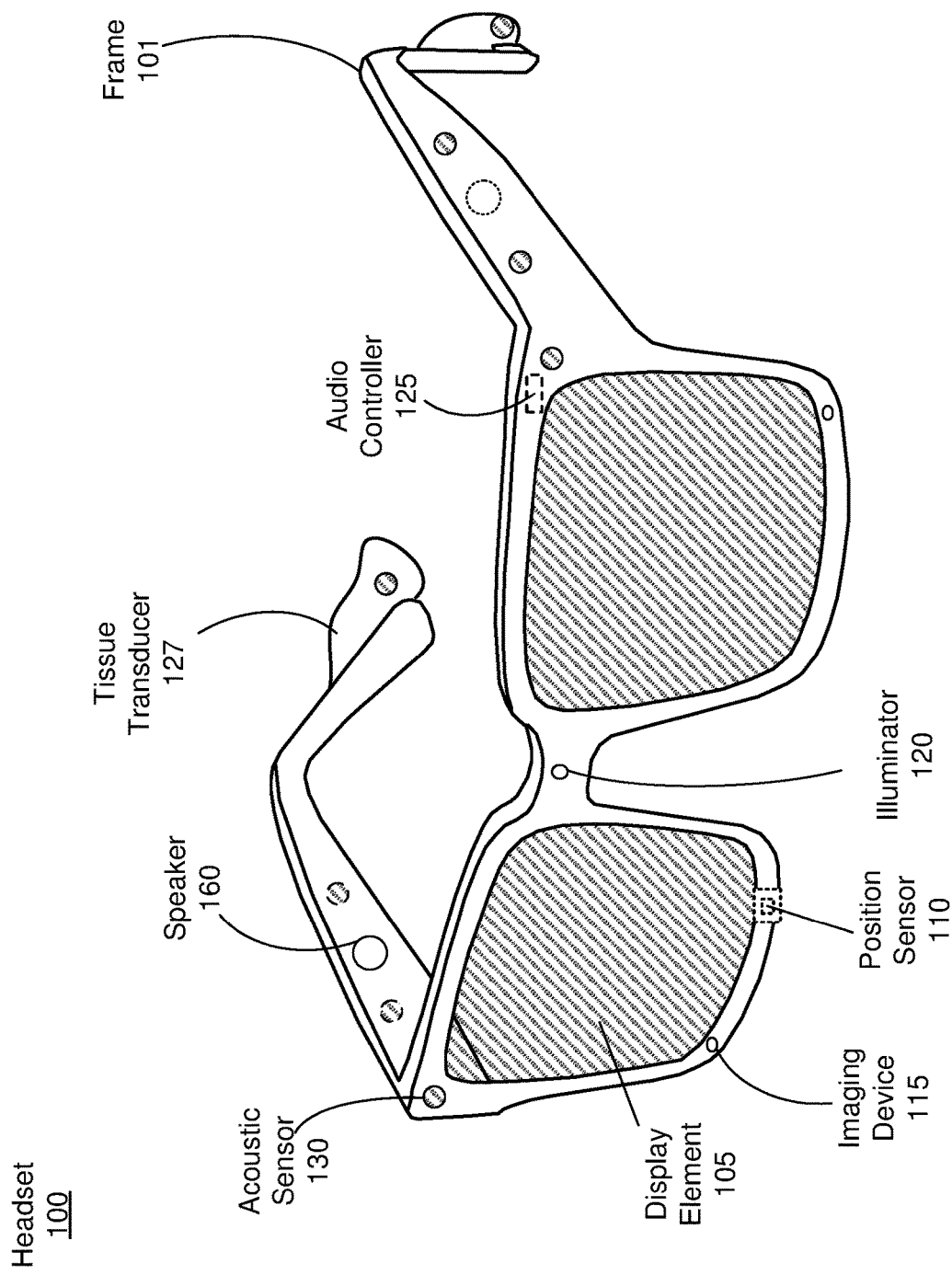
FIG. 1A is a perspective view of a headset implemented as an eyewear device, in accordance with one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

A headset, such as an artificial reality (AR) headset, includes one or more transducers (e.g., speakers) that are part of an audio system for providing audio content to a user. A headset may also include one or more acoustic sensors (e.g., microphones) for capturing ambient audio content. Sound propagation from the transducers to a user's ears and from the environment to microphones, however, can vary from user to user and device to device. In particular, an audio output at the ear of the user can vary based on the anthropometric features of the user's ear and/or head, headset position on the head, etc. The acoustic response of microphones on a head-worn device is also influenced by the anthropometric features of the user's head and the headset position. Anthropometric features are physical characteristics of a user (e.g., ear shape, ear size, ear orientation/position on head, head size, etc.). Note that a headset may be worn in various positions on a head of a user, and the position of the headset on the head may be at some offset from a nominal position. The audio system mitigates degradation of performance caused by use of the headset in different positions (e.g., those that differ from the nominal position). As such, the audio system accounts for the position of the headset on the head of the user by, e.g., adjusting an array transfer function of a microphone array that captures sound from a local area and/or adjusting the audio content provided to the user by the headset.

The audio system may be integrated into the headset (e.g., head-mounted display, near-eye display, eyeglasses, etc.). The audio system determines a position of the headset relative to a position of the head of the user wearing the headset. The audio system determines the position based in part on one or more images of a portion of the head from one or more tracking cameras on the headset. The one or more tracking cameras are inward facing cameras that are configured to capture images of some portion of the head. The one or more tracking cameras may be part of, e.g., an eye tracking and/or face tracking systems.

The audio system may determine the position of the headset by identifying (e.g., via a trained model) one or more landmark features of the head based in part on the one or more images. A landmark feature is an anatomical feature (e.g., one or both eyes, caruncle, medial canthus, lateral canthus, etc.). The audio system is configured to determine the position of a coordinate system of the headset relative to the identified one or more landmark features. For example, the audio system may determine a position of a center of rotation of an eye based in part on the image, and determine a position of the headset relative to the position of the center of rotation.

The audio system adjusts one or more acoustic parameters (e.g., an equalization profile for the user, array transfer function of the microphone array—such that it is individualized for the user, a head-related transfer function for the user, etc.) based in part on the determined position of the headset. For example, the audio system may adjust the equalization profile (and/or some other acoustic parameter) to offset error introduced by the determined position of the headset. The audio system may use a model and the determined position of the headset (relative to the head) to predict an amount of adjustment for the one or more acoustic parameters. The audio system presents audio content (e.g., via a speaker array) in accordance with the adjusted one or more acoustic parameters. The audio system may also capture sound (e.g., via a microphone array) from the local area in accordance with the adjusted one or more acoustic parameters.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to create content in an artificial reality and/or are otherwise used in an artificial reality. The artificial reality system that provides the artificial reality content may be implemented on various platforms, including a wearable device (e.g., headset) connected to a host computer system, a standalone wearable device (e.g., headset), a mobile device or computing system, or any other hardware platform capable of providing artificial reality content to one or more viewers.

FIG. 1A is a perspective view of a headset 100 implemented as an eyewear device, in accordance with one or more embodiments. In some embodiments, the eyewear device is a near eye display (NED). In general, the headset 100 may be worn on the face of a user such that content (e.g., media content) is presented using a display assembly and/or an audio system. However, the headset 100 may also be used such that media content is presented to a user in a different manner. Examples of media content presented by the headset 100 include one or more images, video, audio, or some combination thereof. The headset 100 includes a frame 101, and may include, among other components, a display assembly including one or more display elements 105, a depth camera assembly (DCA), an audio system, and a position sensor 110. While FIG. 1A illustrates the components of the headset 100 in example locations on the headset 100, the components may be located elsewhere on the headset 100, on a peripheral device paired with the headset 100, or some combination thereof. Similarly, there may be more or fewer components on the headset 100 than what is shown in FIG. 1A.

The frame 101 holds the other components of the headset 100. The frame 101 includes a front part that holds the one or more display elements 105 and end pieces (e.g., temples) to attach to a head of the user. The front part of the frame 101 bridges the top of a nose of the user. The length of the end pieces may be adjustable (e.g., adjustable temple length) to fit different users. The end pieces may also include a portion that curls behind the ear of the user (e.g., temple tip, ear piece).

The one or more display elements 105 provide light to a user wearing the headset 100. As illustrated the headset includes a display element 105 for each eye of a user. In some embodiments, a display element 105 generates image light that is provided to an eyebox of the headset 100. The eyebox is a location in space that an eye of user occupies while wearing the headset 100. For example, a display element 105 may be a waveguide display. A waveguide display includes a light source (e.g., a two-dimensional source, one or more line sources, one or more point sources, etc.) and one or more waveguides. Light from the light source is in-coupled into the one or more waveguides which outputs the light in a manner such that there is pupil replication in an eyebox of the headset 100. In-coupling and/or outcoupling of light from the one or more waveguides may be done using one or more diffraction gratings. In some embodiments, the waveguide display includes a scanning element (e.g., waveguide, mirror, etc.) that scans light from the light source as it is in-coupled into the one or more waveguides. Note that in some embodiments, one or both of the display elements 105 are opaque and do not transmit light from a local area around the headset 100. The local area is the area surrounding the headset 100. For example, the local area may be a room that a user wearing the headset 100 is inside, or the user wearing the headset 100 may be outside and the local area is an outside area. In this context, the headset 100 generates VR content. Alternatively, in some embodiments, one or both of the display elements 105 are at least partially transparent, such that light from the local area may be combined with light from the one or more display elements to produce AR and/or MR content.

In some embodiments, a display element 105 does not generate image light, and instead is a lens that transmits light from the local area to the eyebox. For example, one or both of the display elements 105 may be a lens without correction (non-prescription) or a prescription lens (e.g., single vision, bifocal and trifocal, or progressive) to help correct for defects in a user's eyesight. In some embodiments, the display element 105 may be polarized and/or tinted to protect the user's eyes from the sun.

In some embodiments, the display element 105 may include an additional optics block (not shown). The optics block may include one or more optical elements (e.g., lens, Fresnel lens, etc.) that direct light from the display element 105 to the eyebox. The optics block may, e.g., correct for aberrations in some or all of the image content, magnify some or all of the image, or some combination thereof.

The DCA determines depth information for a portion of a local area surrounding the headset 100. The DCA includes one or more imaging devices 115 and a DCA controller (not shown in FIG. 1A), and may also include an illuminator 120. In some embodiments, the illuminator 120 illuminates a portion of the local area with light. The light may be, e.g., structured light (e.g., dot pattern, bars, etc.) in the infrared (IR), IR flash for time-of-flight, etc. In some embodiments, the one or more imaging devices 115 capture images of the portion of the local area that include the light from the illuminator 120. As illustrated, FIG. 1A shows a single illuminator 120 and two imaging devices 115. In alternate embodiments, there is no illuminator 120 and at least two imaging devices 115.

The DCA controller computes depth information for the portion of the local area using the captured images and one or more depth determination techniques. The depth determination technique may be, e.g., direct time-of-flight (ToF) depth sensing, indirect ToF depth sensing, structured light, passive stereo analysis, active stereo analysis (uses texture added to the scene by light from the illuminator 120), some other technique to determine depth of a scene, or some combination thereof.

The headset 100 includes a tracking unit for eye and/or facial tracking. The tracking unit determines tracking information. Tracking information may comprise information about a position and an orientation of one or both eyes (within their respective eye-boxes), information about a position of some portion of a face of the user, or some combination thereof. The tracking unit includes one or more tracking cameras. In some embodiments, the tracking unit estimates an angular orientation of one or both eyes based on images captures of one or both eyes by the one or more tracking cameras. In some embodiments, the tracking unit may also include one or more illuminators that illuminate one or both eyes and/or a portion of the face with an illumination pattern (e.g., structured light, glints, etc.). The tracking unit may use the illumination pattern in the captured images to determine the tracking information. The headset 100 may prompt the user to opt in to allow operation of the tracking unit. For example, by opting in the headset 100 may detect, store, images of the user, tracking information of the user, etc.

The audio system provides audio content. The audio system includes a transducer array, a sensor array, and an audio controller 125. However, in other embodiments, the audio system may include different and/or additional components. Similarly, in some cases, functionality described with reference to the components of the audio system can be distributed among the components in a different manner than is described here. For example, some of the functions of the audio controller may be performed by a remote server. An acoustic parameter is a parameter whose value can have some effect on audio content. An acoustic parameter may include, an equalization profile of the user, a head-related transfer function for the user, an array transfer function of a microphone array of the headset, some other parameter whose value may affect audio content, or some combination thereof. The audio controller 125 may be configured to determine a position of the headset 100 relative to a position of a head of the user. The audio controller 125 may base the determination in part on, e.g., one or more images of a portion of the head from a tracking camera (e.g., of the DCA), data from the position sensor 110, etc. The one or more tracking cameras are inward facing cameras that are configured to capture images of some portion of the head. The one or more tracking cameras may be part of the tracking unit. The audio controller 125 is configured to adjust one or more acoustic parameters based in part on the determined position of the headset.

The transducer array presents sound to user. The transducer array includes a plurality of transducers. A transducer may be a speaker 160 or a tissue transducer 127 (e.g., a bone conduction transducer or a cartilage conduction transducer). Although the speakers 160 are shown exterior to the frame 101, the speakers 160 may be enclosed in the frame 101. In some embodiments, instead of individual speakers for each ear, the headset 100 includes a speaker array comprising multiple speakers integrated into the frame 101 to improve directionality of presented audio content. The tissue transducer 127 couples to the head of the user and directly vibrates tissue (e.g., bone or cartilage) of the user to generate sound. The number and/or locations of transducers may be different from what is shown in FIG. 1A. In some embodiments, the audio system may present, using the transduce array, audio content in accordance with the adjusted one or more acoustic parameters.

The sensor array detects sounds within the local area of the headset 100. The sensor array includes a plurality of acoustic sensors 130. An acoustic sensor 130 captures sounds emitted from one or more sound sources in the local area (e.g., a room). Each acoustic sensor is configured to detect sound and convert the detected sound into an electronic format (analog or digital). The acoustic sensors 130 may be acoustic wave sensors, microphones, sound transducers, or similar sensors that are suitable for detecting sounds.

In some embodiments, one or more acoustic sensors 130 may be placed in an ear canal of each ear (e.g., acting as binaural microphones). In some embodiments, the acoustic sensors 130 may be placed on an exterior surface of the headset 100, placed on an interior surface of the headset 100, separate from the headset 100 (e.g., part of some other device), or some combination thereof. The number and/or locations of acoustic sensors 130 may be different from what is shown in FIG. 1A. For example, the number of acoustic detection locations may be increased to increase the amount of audio information collected and the sensitivity and/or accuracy of the information. The acoustic detection locations may be oriented such that the microphone is able to detect sounds in a wide range of directions surrounding the user wearing the headset 100.

The audio controller 125 processes information from the sensor array that describes sounds detected by the sensor array. The audio controller 125 may comprise a processor and a computer-readable storage medium. The audio controller 125 may be configured to generate direction of arrival (DOA) estimates, generate acoustic transfer functions (e.g., array transfer functions and/or head-related transfer functions), track the location of sound sources, form beams in the direction of sound sources, classify sound sources, generate sound filters for the speakers 160, or some combination thereof.

The position sensor 110 generates one or more measurement signals in response to motion of the headset 100. The position sensor 110 may be located on a portion of the frame 101 of the headset 100. The position sensor 110 may include an inertial measurement unit (IMU). Examples of position sensor 110 include: one or more accelerometers, one or more gyroscopes, one or more magnetometers, another suitable type of sensor that detects motion, a type of sensor used for error correction of the IMU, or some combination thereof. The position sensor 110 may be located external to the IMU, internal to the IMU, or some combination thereof.

In some embodiments, the headset 100 may provide for simultaneous localization and mapping (SLAM) for a position of the headset 100 and updating of a model of the local area. For example, the headset 100 may include a passive camera assembly (PCA) that generates color image data. The PCA may include one or more RGB cameras that capture images of some or all of the local area. In some embodiments, some or all of the imaging devices 115 of the DCA may also function as the PCA. The images captured by the PCA and the depth information determined by the DCA may be used to determine parameters of the local area, generate a model of the local area, update a model of the local area, or some combination thereof. Furthermore, the position sensor 110 tracks the position (e.g., location and pose) of the headset 100 within the room.

Figure 1B:
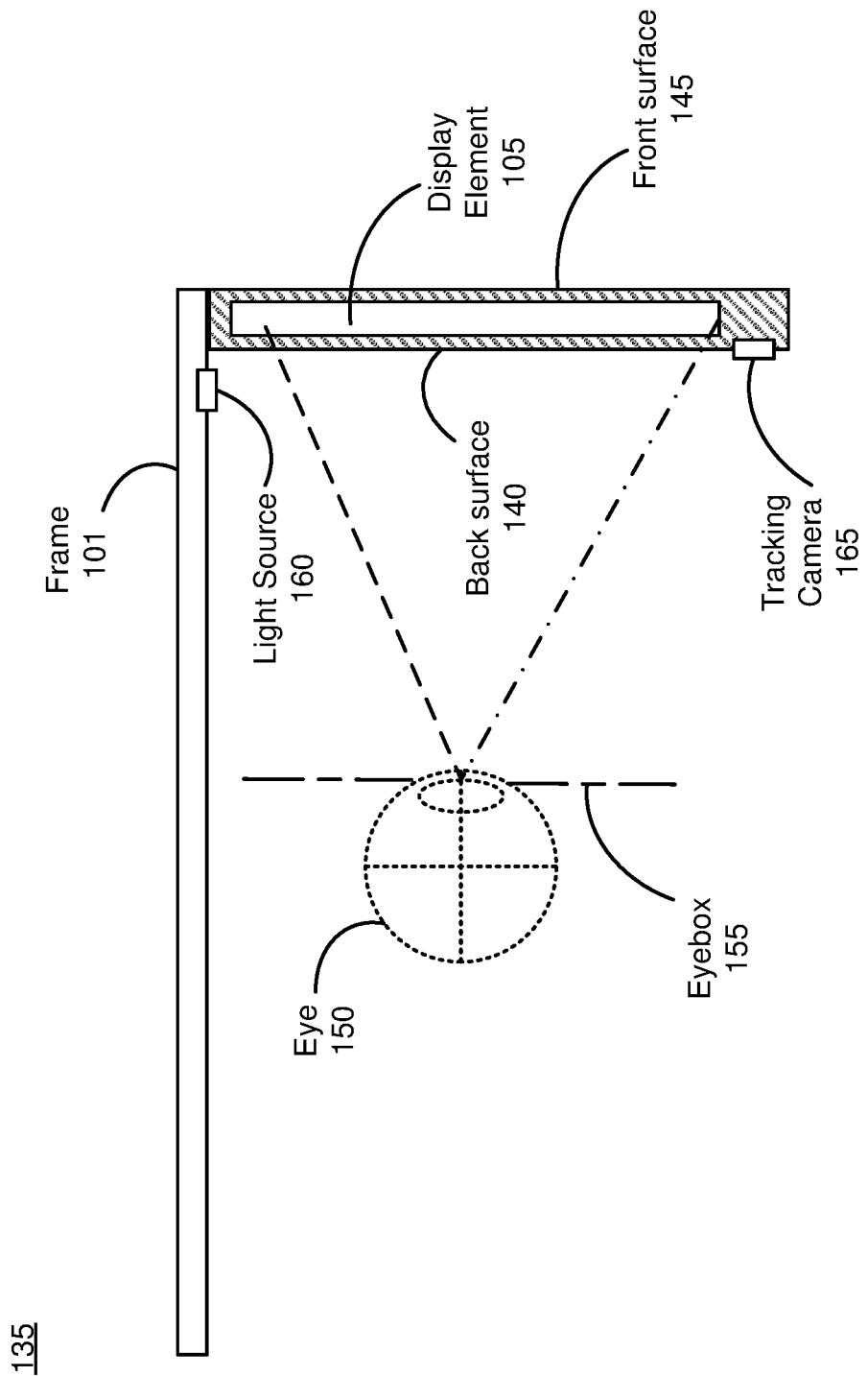
FIG. 1B is a cross section of the eyewear device of FIG. 1A, in accordance with an embodiment.

FIG. 1B is a cross-section 135 of the headset 100 illustrated in FIG. 1A, in accordance with an embodiment. The display element 105 is housed in the frame 101. The display element 105 has a back surface 140, which faces inward relative to the user, and a front surface 145, which faces outward relative to a user. An eyebox 155 shows a location in space where an eye 150 is positioned while wearing the headset 100. The headset 100 includes a tracking unit. The tracking unit includes one or more light sources (e.g., a light source 160) and one or more tracking cameras (e.g., a tracking camera 165). For purposes of illustration, FIG. 1B shows the cross section 135 associated with a single eye, a single display element, and a single tracking unit, but in some embodiments, another display element and another tracking unit can be included for the other eye of the user. Moreover, in some embodiments the headset 100 may include additional light sources and/or tracking units for each side of the face.

In the illustrated embodiment, the tracking unit functions as an eye tracking system. The tracking unit determines eye tracking information for the user's eye 150. The determined eye tracking information may comprise information about a position of the user's eye 150 in an eyebox 155, e.g., information about an angle of an eye-gaze. An eyebox represents a three-dimensional volume at an output of a display in which the user's eye is located to receive image light.

As mentioned above, the tracking unit includes one or more light sources (e.g., the light source 160) and the tracking camera 165. The one or more light sources are configured to emit light at a particular wavelength or within a particular band of wavelengths. For example, the one or more light sources may be configured to emit light in the infrared band (~750 nm to 1700 nm), in a visible band (~380 nm to 750 nm), in the ultraviolet band (300 nm to 380 nm), or some other portion of the electromagnetic spectrum. The one or more light sources may be configured to emit light in a sub-division of a band, e.g., in the near-infrared band, the short-wavelength infrared band, or a particular color of visible light, or at a particular wavelength. The one or more light sources may be, for example, laser diodes (e.g., edge emitters), inorganic or organic LEDs, vertical-cavity surface-emitting lasers (VCSELs), or some other source. In some embodiments, one or more of the light sources may emit structured light. Structured light is light that can be used to determine depth information by allowing the correspondence between the light source, angular position on the object, and the camera position. Structured light may include, e.g., a pattern of dots, a pattern of lines, a pattern of sinusoids, some other light that can be used to determine depth information, or some combination thereof.

The one or more tracking cameras capture one or more images of a portion of the head of the user. The portions of the head may include, e.g., one or both eyes, portions of the face (cheeks, brow, mouth, etc.), portions of the face surrounding the eye (e.g., caruncle, medial canthus, lateral canthus, etc.), or some combination thereof. As illustrated in FIG. 1B, the tracking camera 165 captures one or more images of the eye 150 and portions of the face surrounding the eye 150 illuminated by the light source 160. But in other embodiments not shown one more tracking cameras are positioned elsewhere on the headset 100 and capture images of different portions of the head of the user. The one or more tracking camera captures light in a band of light emitted by the one or more light sources. And in some embodiments, at least some of the tracking cameras may capture light in the visible band.

The tracking unit analyzes the captured images to measure a point of gaze of the user (i.e., an eye position), the motion of the eye 150 of the user (i.e., eye movement), or both. In some embodiments, the tracking unit determines depth information for the eye 150 based in part on the captured images and a depth determination technique (e.g., structured light, stereo, etc.). Additional discussion regarding how the tracking unit determines depth information is found in, e.g., U.S. application Ser. No. 15/456,383 and U.S. application Ser. No. 15/335,634, both of which are hereby incorporated by reference.

In some embodiments, the tracking unit provides the one or more images captured by the one or more tracking cameras (e.g., the tracking camera 165) to the audio system. As described below with regard to FIG. 2, the audio system may use the one or more images to determines a position of the headset relative to a position of the head of the user wearing the headset. In some embodiments, the tracking unit may provide depth information describing a portion of the head of the user to the audio system.

Figure 1C:
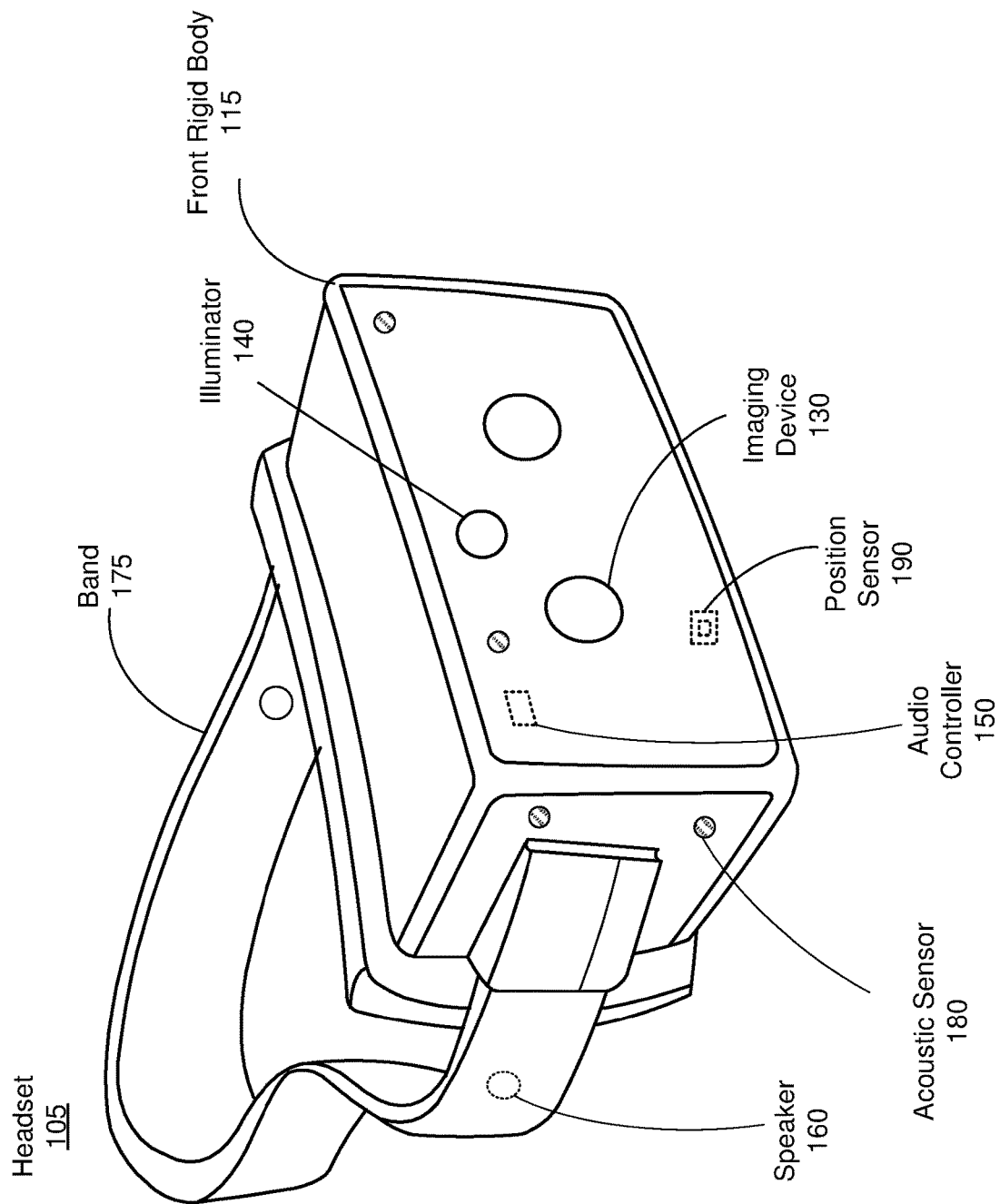
FIG. 1C is a perspective view of a headset implemented as a head-mounted display, in accordance with one or more embodiments.

FIG. 1C is a perspective view of a headset 105 implemented as a HMD, in accordance with one or more embodiments. In embodiments that describe an AR system and/or a MR system, portions of a front side of the HMD are at least partially transparent in the visible band (~380 nm to 750 nm), and portions of the HMD that are between the front side of the HMD and an eye of the user are at least partially transparent (e.g., a partially transparent electronic display). The HMD includes a front rigid body 115 and a band 175. The headset 105 includes many of the same components described above with reference to FIG. 1A, but modified to integrate with the HMD form factor. For example, the HMD includes a display assembly, a DCA, an audio system, and a position sensor 110. FIG. 1B shows the illuminator 120, a plurality of the speakers 160, a plurality of the imaging devices 115, a plurality of acoustic sensors 130, and the position sensor 110. The speakers 160 may be located in various locations, such as coupled to the band 175 (as shown), coupled to front rigid body 115, or may be configured to be inserted within the ear canal of a user.

Figure 2:
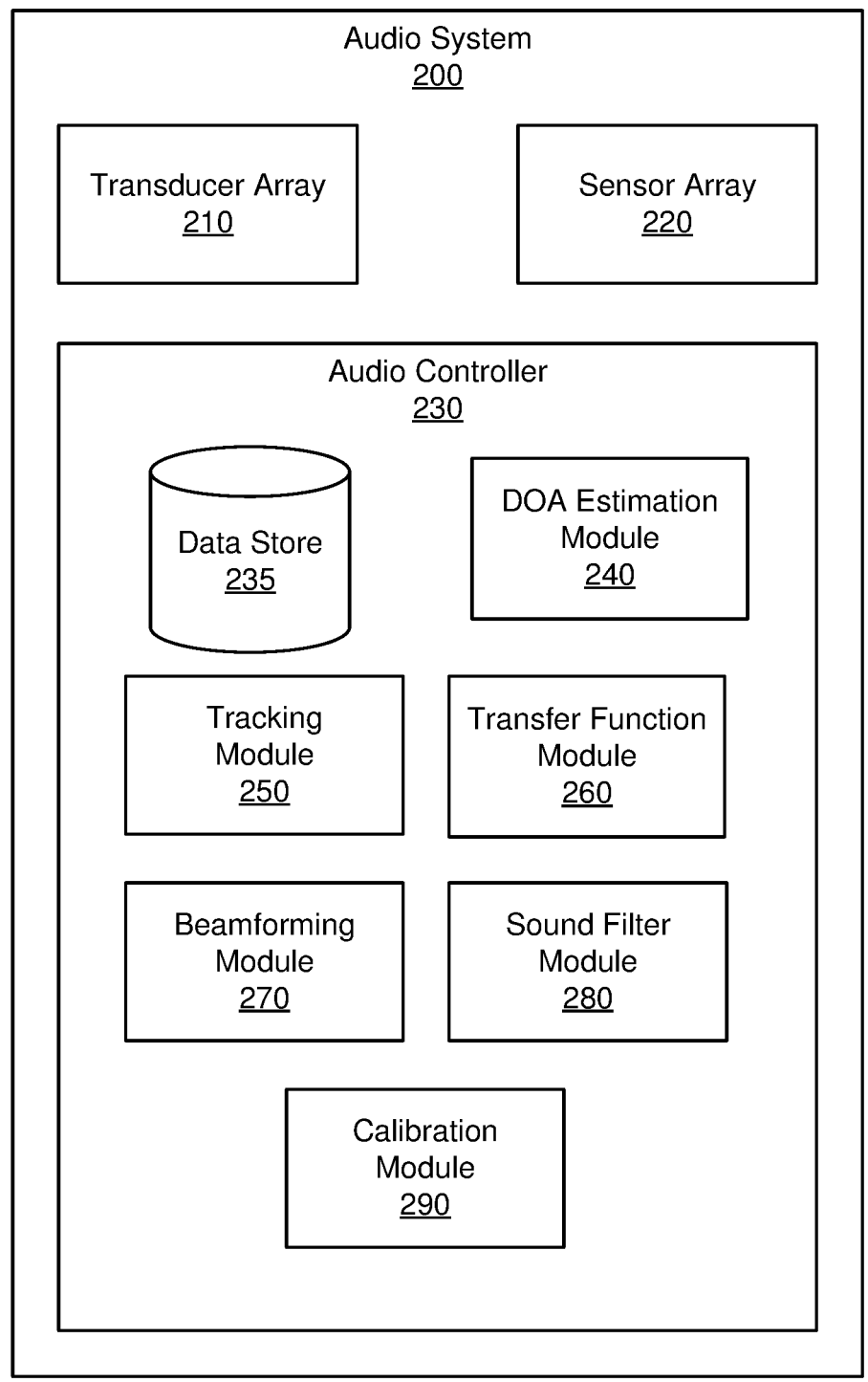
FIG. 2 is a block diagram of an audio system, in accordance with one or more embodiments.

FIG. 2 is a block diagram of an audio system 200, in accordance with one or more embodiments. The audio system in FIG. 1A or FIG. 1C may be an embodiment of the audio system 200. The audio system 200 generates one or more acoustic transfer functions for a user. The audio system 200 may then use the one or more acoustic transfer functions to generate audio content for the user. In the embodiment of FIG. 2, the audio system 200 includes a transducer array 210, a sensor array 220, and an audio controller 230. Some embodiments of the audio system 200 have different components than those described here. Similarly, in some cases, functions can be distributed among the components in a different manner than is described here.

The transducer array 210 is configured to present audio content. The transducer array 210 includes a plurality of transducers. A transducer is a device that provides audio content. A transducer may be, e.g., a speaker (e.g., the speaker 160), a tissue transducer (e.g., the tissue transducer 127), some other device that provides audio content, or some combination thereof. A tissue transducer may be configured to function as a bone conduction transducer or a cartilage conduction transducer. The transducer array 210 may present audio content via air conduction (e.g., via one or more speakers), via bone conduction (via one or more bone conduction transducer), via cartilage conduction audio system (via one or more cartilage conduction transducers), or some combination thereof. In some embodiments, the transducer array 210 may include one or more transducers to cover different parts of a frequency range. For example, a piezoelectric transducer may be used to cover a first part of a frequency range and a moving coil transducer may be used to cover a second part of a frequency range.

The bone conduction transducers generate acoustic pressure waves by vibrating bone/tissue in the user's head. A bone conduction transducer may be coupled to a portion of a headset, and may be configured to be behind the auricle coupled to a portion of the user's skull. The bone conduction transducer receives vibration instructions from the audio controller 230, and vibrates a portion of the user's skull based on the received instructions. The vibrations from the bone conduction transducer generate a tissue-borne acoustic pressure wave that propagates toward the user's cochlea, bypassing the eardrum.

The cartilage conduction transducers generate acoustic pressure waves by vibrating one or more portions of the auricular cartilage of the ears of the user. A cartilage conduction transducer may be coupled to a portion of a headset, and may be configured to be coupled to one or more portions of the auricular cartilage of the ear. For example, the cartilage conduction transducer may couple to the back of an auricle of the ear of the user. The cartilage conduction transducer may be located anywhere along the auricular cartilage around the outer ear (e.g., the pinna, the tragus, some other portion of the auricular cartilage, or some combination thereof). Vibrating the one or more portions of auricular cartilage may generate: airborne acoustic pressure waves outside the ear canal; tissue born acoustic pressure waves that cause some portions of the ear canal to vibrate thereby generating an airborne acoustic pressure wave within the ear canal; or some combination thereof. The generated airborne acoustic pressure waves propagate down the ear canal toward the ear drum.

The transducer array 210 generates audio content in accordance with instructions from the audio controller 230. In some embodiments, the audio content is spatialized. Spatialized audio content is audio content that appears to originate from a particular direction and/or target region (e.g., an object in the local area and/or a virtual object). For example, spatialized audio content can make it appear that sound is originating from a virtual singer across a room from a user of the audio system 200. The transducer array 210 may be coupled to a wearable device (e.g., the headset 100 or the headset 105). In alternate embodiments, the transducer array 210 may be a plurality of speakers that are separate from the wearable device (e.g., coupled to an external console).

The sensor array 220 detects sounds within a local area surrounding the sensor array 220. The sensor array 220 may include a plurality of acoustic sensors that each detect air pressure variations of a sound wave and convert the detected sounds into an electronic format (analog or digital). The plurality of acoustic sensors may be positioned on a headset (e.g., headset 100 and/or the headset 105), on a user (e.g., in an ear canal of the user), on a neckband, or some combination thereof. An acoustic sensor may be, e.g., a microphone, a vibration sensor, an accelerometer, or any combination thereof. In some embodiments, the sensor array 220 is configured to monitor the audio content generated by the transducer array 210 using at least some of the plurality of acoustic sensors. Increasing the number of sensors may improve the accuracy of information (e.g., directionality) describing a sound field produced by the transducer array 210 and/or sound from the local area.

The audio controller 230 controls operation of the audio system 200. In the embodiment of FIG. 2, the audio controller 230 includes a data store 235, a DOA estimation module 240, a tracking module 250, a transfer function module 260, a beamforming module 270, a sound filter module 280, and a calibration module 290. The audio controller 230 may be located inside a headset, in some embodiments. Some embodiments of the audio controller 230 have different components than those described here. Similarly, functions can be distributed among the components in different manners than described here. For example, some functions of the controller may be performed external to the headset. The user may opt in to allow the audio controller 230 to transmit data captured by the headset to systems external to the headset, and the user may select privacy settings controlling access to any such data.

The data store 235 stores data for use by the audio system 200. Data in the data store 235 may include sounds recorded in the local area of the audio system 200, audio content, head-related transfer functions (HRTFs), transfer functions for one or more sensors, array transfer functions (ATFs) for one or more of the acoustic sensors, sound source locations, virtual model of local area, direction of arrival estimates, sound filters, equalization and/or calibration filters, electro-mechanical and/or electro-acoustic models of transducers, electro-mechanical and/or electro-acoustic models of acoustic sensors, images of portions of a head of the user (e.g., eyes and/or portions of face, etc.), a headset position model, an headset acoustic model, one or more acoustic parameters, and other data relevant for use by the audio system 200, or any combination thereof.

The headset position model maps positions (inclusive of orientations) of one or more landmark features to a different positions of the headset on the head of the user. A landmark feature is an anatomical feature of the head that may be used to identify a position (inclusive of orientation) of the headset relative to the head. A landmark feature may be, e.g., one or both eyes, caruncle, medial canthus, lateral canthus, some other anatomical feature of the head that may be used to identify a position of the headset, or some combination thereof.

The headset acoustic model maps a position of the headset on a head of a user to specific values of one or more acoustic parameters. Acoustic parameters are parameters which can affect how the audio system 200 presents audio content to a user and/or captures sound from the local area of the headset. An acoustic parameter may be, e.g., an equalization profile for the user, an HRTF for the user, an array transfer function of the sensor array 220 (e.g., a microphone array), or some combination thereof.

Note that in some embodiments, the headset position model and the headset acoustic model are replaced with a combined model that has the functionality of both models. In this manner, images and/or identified landmarks are provided to the combined model, which can then output adjusted values for one or more acoustic parameters. In some embodiments, the combined model may also include aspects from different models. For example, the combined model may additionally include electro-mechanical and/or electro-acoustic models of transducers, electro-mechanical and/or electro-acoustic models of acoustic sensors, or some combination thereof.

Each user has an associated equalization profile. The equalization profile includes values for one or more parameters that are applied to audio content to adjust the audio content to a target response at the ear of the user so that the user perceives the audio content as a creator of the audio content intended it to be heard. The parameters may include, e.g., wavelength, frequency, volume, pitch, balance, other spectral content, acoustic time delay, etc. In one embodiment, the target response is associated with predetermined values (or a range of acceptable values) for each of the parameters. The predetermined values (or range of acceptable values) for each of the parameters correspond to a relatively high acceptable threshold of sound quality that a content creator intended the audio content to be perceived by the user.

The DOA estimation module 240 is configured to localize sound sources in the local area based in part on information from the sensor array 220. Localization is a process of determining where sound sources are located relative to the user of the audio system 200. The DOA estimation module 240 performs a DOA analysis to localize one or more sound sources within the local area. The DOA analysis may include analyzing the intensity, spectra, and/or arrival time of each sound at the sensor array 220 to determine the direction from which the sounds originated. In some cases, the DOA analysis may include any suitable algorithm for analyzing a surrounding acoustic environment in which the audio system 200 is located.

For example, the DOA analysis may be designed to receive input signals from the sensor array 220 and apply digital signal processing algorithms to the input signals to estimate a direction of arrival. These algorithms may include, for example, delay and sum algorithms where the input signal is sampled, and the resulting weighted and delayed versions of the sampled signal are averaged together to determine a DOA. A least mean squared (LMS) algorithm may also be implemented to create an adaptive filter. This adaptive filter may then be used to identify differences in signal intensity, for example, or differences in time of arrival. These differences may then be used to estimate the DOA. In another embodiment, the DOA may be determined by converting the input signals into the frequency domain and selecting specific bins within the time-frequency (TF) domain to process. Each selected TF bin may be processed to determine whether that bin includes a portion of the audio spectrum with a direct path audio signal. Those bins having a portion of the direct-path signal may then be analyzed to identify the angle at which the sensor array 220 received the direct-path audio signal. The determined angle may then be used to identify the DOA for the received input signal. Other algorithms not listed above may also be used alone or in combination with the above algorithms to determine DOA.

In some embodiments, the DOA estimation module 240 may also determine the DOA with respect to an absolute position of the audio system 200 within the local area. The position of the sensor array 220 may be received from an external system (e.g., some other component of a headset, an artificial reality console, a mapping server, a position sensor (e.g., the position sensor 110), etc.). The external system may create a virtual model of the local area, in which the local area and the position of the audio system 200 are mapped. The received position information may include a location and/or an orientation of some or all of the audio system 200 (e.g., of the sensor array 220). The DOA estimation module 240 may update the estimated DOA based on the received position information.

The tracking module 250 is configured to track locations of one or more sound sources. The tracking module 250 may compare current DOA estimates and compare them with a stored history of previous DOA estimates. In some embodiments, the audio system 200 may recalculate DOA estimates on a periodic schedule, such as once per second, or once per millisecond. The tracking module may compare the current DOA estimates with previous DOA estimates, and in response to a change in a DOA estimate for a sound source, the tracking module 250 may determine that the sound source moved. In some embodiments, the tracking module 250 may detect a change in location based on visual information received from the headset or some other external source. The tracking module 250 may track the movement of one or more sound sources over time. The tracking module 250 may store values for a number of sound sources and a location of each sound source at each point in time. In response to a change in a value of the number or locations of the sound sources, the tracking module 250 may determine that a sound source moved. The tracking module 250 may calculate an estimate of the localization variance. The localization variance may be used as a confidence level for each determination of a change in movement.

The tracking module 250 tracks a position of a headset that includes the audio system 200 relative to a position of a head of a user wearing the headset. The tracking module 250 is configured to determine a position of the headset relative to a position of a head of a user wearing the headset, based in part on one or more images of a portion of the head from one or more tracking cameras on the headset. The tracking cameras may be part of, e.g., a tracking unit as describe above with regard to FIGS. 1A-C. The tracking module 250 may use various object recognition algorithms to identify landmark features in images. The tracking module 250 may infer the position of the head from externally observable features (e.g., landmark features) in one or more images. In some embodiments, the object recognition algorithms may be performed by a trained model (e.g., via machine learning). In some embodiments, there may be a plurality of images of a portion of the head, and at least some of the plurality of images have overlapping fields of view. In this manner, images with different perspectives of a same portion of the head (e.g., an landmark feature) may be obtained.

The tracking module 250 uses a headset position model to determine a position of the headset relative to the head of the user (e.g., determine a position of a coordinate system of the headset relative to landmark feature) based in part on one or more identified landmark features. The headset position model maps positions (inclusive of orientations) of one or more landmark features to different positions of the headset on the head of the user. The headset position model may include a virtual model of a virtual head wearing a virtual headset, where the position of the virtual headset on the virtual head may be adjusted. The virtual head includes locations and orientations of one or more virtual landmark features on the head. The virtual headset corresponds to the headset that in which the audio system 200 is integrated (e.g., the headset 100). The virtual headset includes virtual cameras that mimic (e.g., have same position and field of view) the tracking cameras of the headset. For a given landmark feature identified from an image, there is a corresponding virtual landmark feature on the virtual model of the head. In some embodiments, the tracking module 250 identifies one or more virtual cameras that correspond to the one or more imaging cameras that captured the images. The tracking module 250 uses the virtual models of the head and headset to determine a headset position (i.e., what positions of the one or more virtual cameras) that would result in the virtual cameras having perspectives of the virtual landmark features that match the perspectives of the identified landmark features in the captured images.

In some embodiments, the virtual head of the user is adjusted based in part on the one or more images. For example, eye gaze, changes in expression, etc., captured in the one or more images may be used to update the virtual head of the model. The updates to the virtual head of the model may also include distortions in shape and/or position of a landmark feature captured in one or more images. In some embodiments, the tracking module 250 may use one or both eyes as landmark features. For example, the tracking module 250 may determine a position of a center of rotation of each eye based in part on one or more of the images. The tracking module 250 may determine a position of the headset relative to the position of the center of rotation for one or both eyes. Note that using the centers of rotation of one or both eyes to determine position helps mitigate errors that may occur using other landmark features (e.g., because some parts of the head move as the user changes expression in some cases it can make it difficult to reliably and accurately locate landmark features in a repeatable manner). Using centers of rotation of the user's eyes to determine a position of the headset on the head is described below with regard to FIG. 3C.

The transfer function module 260 is configured to generate one or more acoustic transfer functions. Generally, a transfer function is a mathematical function giving a corresponding output value for each possible input value. Based on parameters of the detected sounds, the transfer function module 260 generates one or more acoustic transfer functions associated with the audio system. The acoustic transfer functions may be array transfer functions (ATFs), head-related transfer functions (HRTFs), other types of acoustic transfer functions, or some combination thereof. An ATF characterizes how the microphone receives a sound from a point in space. As described below, values for these transfer functions may be adjusted based in part on the determined position of the headset on the head of the user.

An ATF includes a number of transfer functions that characterize a relationship between the sound source and the corresponding sound received by the acoustic sensors in the sensor array 220. Accordingly, for a sound source there is a corresponding transfer function for each of the acoustic sensors in the sensor array 220. And collectively the set of transfer functions is referred to as an ATF. Accordingly, for each sound source there is a corresponding ATF. Note that the sound source may be, e.g., someone or something generating sound in the local area, the user, or one or more transducers of the transducer array 210. The ATF for a particular sound source location relative to the sensor array 220 may differ from user to user due to a person's anatomy (e.g., ear shape, shoulders, etc.) that affects the sound as it travels to the person's ears. Accordingly, the ATFs of the sensor array 220 are personalized for each user of the audio system 200.

In some embodiments, the transfer function module 260 determines one or more HRTFs for a user of the audio system 200. The HRTF characterizes how an ear receives a sound from a point in space. The HRTF for a particular source location relative to a person is unique to each ear of the person (and is unique to the person) due to the person's anatomy (e.g., ear shape, shoulders, etc.) that affects the sound as it travels to the person's ears. In some embodiments, the transfer function module 260 may determine HRTFs for the user using a calibration process. In some embodiments, the transfer function module 260 may provide information about the user to a remote system. The user may adjust privacy settings to allow or prevent the transfer function module 260 from providing the information about the user to any remote systems. The remote system determines a set of HRTFs that are customized to the user using, e.g., machine learning, and provides the customized set of HRTFs to the audio system 200.

The transfer function module 260 adjusts one or more acoustic parameters based in part on the determined position of the headset (e.g., as determined by the tracking module 250). The transfer function module 260 uses the headset acoustic model to determine values for one or more acoustic parameters. The headset acoustic model maps various positions of the headset on the head of the user to corresponding values of one or more acoustic parameters. Accordingly, given a position of the headset on the head, the headset acoustic model can determine values for one or more acoustic parameters. The acoustic parameters may be, e.g., an equalization profile for the user, an ATF, one or more HRTFs for the user, etc. The transfer function module 260 may then adjust one or more acoustic parameters using the determined values. In this manner, the transfer function module 260 can mitigate error in one or more acoustic parameters caused by variable positioning of the headset on the head of the user.

The beamforming module 270 is configured to process one or more ATFs to selectively emphasize sounds from sound sources within a certain area while de-emphasizing sounds from other areas. In analyzing sounds detected by the sensor array 220, the beamforming module 270 may combine information from different acoustic sensors to emphasize sound associated from a particular region of the local area while deemphasizing sound that is from outside of the region. The beamforming module 270 may isolate an audio signal associated with sound from a particular sound source from other sound sources in the local area based on, e.g., different DOA estimates from the DOA estimation module 240 and the tracking module 250. The beamforming module 270 may thus selectively analyze discrete sound sources in the local area. In some embodiments, the beamforming module 270 may enhance a signal from a sound source. For example, the beamforming module 270 may apply sound filters which eliminate signals above, below, or between certain frequencies. Signal enhancement acts to enhance sounds associated with a given identified sound source relative to other sounds detected by the sensor array 220.

The sound filter module 280 determines sound filters for the transducer array 210. In some embodiments, the sound filters cause the audio content to be spatialized, such that the audio content appears to originate from a target region. The sound filter module 280 uses the acoustic parameters (e.g., as determined by the transfer function module 260) to generate the sound filters. In some embodiments, the sound filter module 280 may also use audio parameters to generate the sound filters. The audio parameters describe audio properties of a local area surrounding the audio system 200. The acoustic parameters may include, e.g., a reverberation time, a reverberation level, a room impulse response, etc. In some embodiments, the sound filter module 280 calculates one or more of the audio parameters. In some embodiments, the sound filter module 280 requests the audio parameters from a mapping server (e.g., as described below with regard to FIG. 5). The sound filter module 280 provides the sound filters to the transducer array 210. In some embodiments, the sound filters may cause positive or negative amplification of sounds as a function of frequency.

The calibration module 290 calibrates one or more models of the audio system 200. The one or more models may include, e.g., the headset position model, the headset acoustic model, the combined model. In some embodiments, the calibration module 290 prompts the user to place the headset at a nominal position on the head. The nominal position is a position of the headset relative to the head at which the user generally wears the headset. The calibration module 290 collects images from tracking cameras for the nominal position of the headset, the calibration module 290 identifies landmark identifiers in the images, and updates the headset position model (or combined model) such that the positions of the identified landmark identifiers are mapped to the nominal position of the headset. The mapping determines a position of each of the identified landmark feature relative to the coordinate system of the headset.

The headset position model may include a virtual model of a head of the user and a virtual model of the headset on the virtual model of the head. The virtual model of the head may also model a shape and position of each eye of the user, in order to infer a location of a center of rotation of each eye. The calibration module 290 may calibrate the virtual model of the head to determine the shape and position of each eye of the user (e.g., to determine a center of rotation for one or both eyes of the user). Calibration of this model is described below with regard to FIG. 3C.

The calibration module 290 calibrates values for one or more of the acoustic parameters for the nominal position. The calibration module 290 updates the headset acoustic model (or combined model) such that the determined values of the one or more acoustic parameters are mapped to the nominal position of the headset. In some embodiments, the calibration module 290 then prompts the user to adjust the headset to one or more different positions on the head, and repeat the above process for each of the one or more different positions. In this manner the calibration module 290 updates the combined model, or the headset position model and the headset acoustic model with information for each of the one or more positions. In some embodiments, the one or more models may process (e.g., interpolate, extrapolate, etc.) the information for the one or more positions to extend their respective mappings to positions not expressly tested. For example, the headset acoustic model (or combined model) can map a specific position of the headset to corresponding values of one or more acoustic parameters regardless of whether or not the calibration module 290 calibrated the model for that specific position.

Figure 3B:
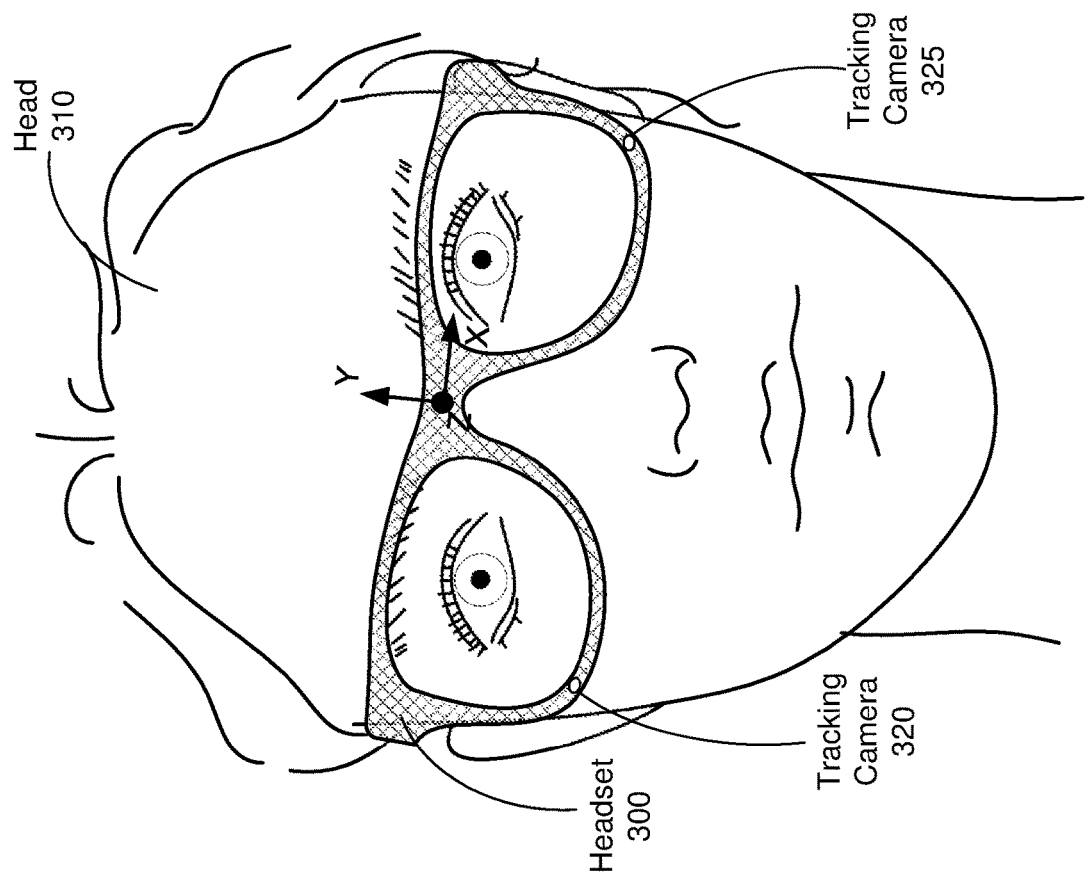
FIG. 3B is the headset of FIG. 3A in a second position on the head of the user, in accordance with one or more embodiments.
Figure 3A:
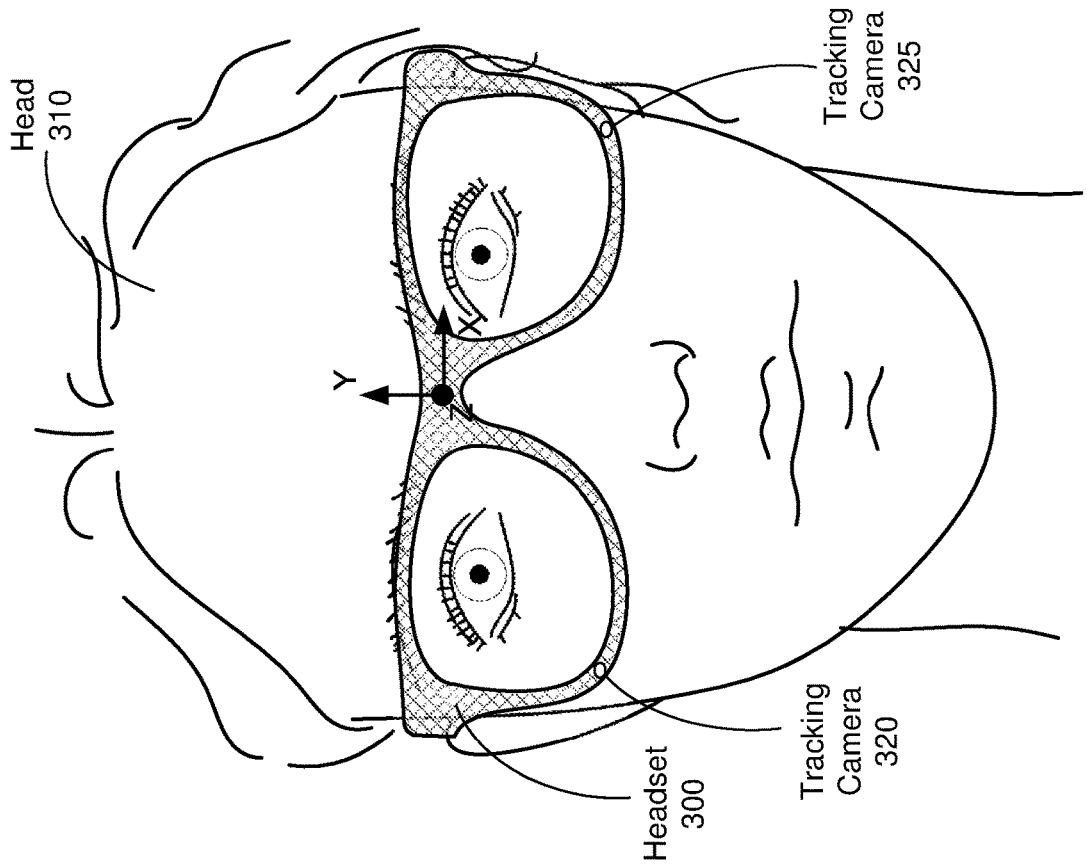
FIG. 3A is a headset in a nominal position on a head of a user, in accordance with one or more embodiments.

FIG. 3A is a headset 300 in a nominal position on a head 310 of a user, in accordance with one or more embodiments. The headset 300 is an embodiment of the headset 100. The nominal position of the headset 300 is a position of the headset 300 relative to the head 310 at which the user generally wears the headset 300. The headset 300 includes an audio system (e.g., the audio system 200) and a tracking camera 320 and a tracking camera 325. The tracking cameras 320, 325 are inward facing cameras configured to captured images of different portions of the head 310. As illustrated, the different portions of the head 310 may include, e.g., both eyes, caruncle for each eye, medial canthus for each eye, lateral canthus for each eye, etc. As noted above, the tracking cameras 320, 325 may be part of, e.g., a tracking unit that is separate from the audio system.

The audio system determines a position of the headset 300 using images from the tracking cameras 320, 325. The audio system identifies one or more landmark features in the images (e.g., using a trained model, object recognition algorithm(s), etc.). Note that each identified landmark feature has a specific position (inclusive of orientation) in the image. In some embodiments, the audio system inputs the identified landmark features into a headset position model to identify a position of the headset 300 relative to the head 310. The headset position model maps positions (inclusive of orientations) of landmark features to a different positions of the headset on the head of the user. In the illustrated embodiment, the headset position model would output a position of the headset that is the nominal headset position.

The audio system determines values for one or more acoustic parameters. The audio system inputs the determined headset position into a headset acoustic model. As described above with regard to FIG. 2, the headset acoustic model maps a position of the headset on a head of a user to specific values of one or more acoustic parameters. As illustrated, the headset is in a nominal position, and the headset acoustic model would output one or more values for acoustic parameters that correspond to the nominal position. For example, the headset acoustic model may provide values for parameters of an equalization profile of the user.

In other embodiments, the headset position model and the headset acoustic model are combined into a single combined model. In these cases, the audio system may input the captured images and/or identified landmark features into the combined model, and the combined model outputs the adjusted values for the one or more acoustic parameters.

The audio system may use the values for the one or more acoustic parameters to present audio content to the user.

Note, that the headset 300 may shift on the head 310 resulting in a change in position on the head 310 of the user. The change in position can affect how the user perceives audio content presented by the audio system.

For example, FIG. 3B is the headset 300 of FIG. 3A in a second position on the head 310 of the user, in accordance with one or more embodiments. In FIG. 3B, the head 310 has not changed position from FIG. 3A, but the headset 300 has changed its position on the head 310 such that it is in a different position than what is shown in FIG. 3A (i.e., nominal position).

The audio system samples images from the tracking camera 320 and/or the image device 325 to determine a position of the headset 300. The audio system then identifies landmark features, and uses the headset position model to identify a current position of the headset 300 on the head 310. In some embodiments, the audio system continuously samples images from one or both tracking cameras 320, 325 and continuously determines a position of the headset 300. In other embodiments, the audio system intermittently (e.g., may be periodic) samples images from one or both tracking cameras 320, 325 and determines a position of the headset 300.

In some embodiments, headset 300 may also include a position sensor (e.g., the position sensor 110), and the audio system may use data from the position sensor to determine whether to sample and process images from one or both tracking cameras 320, 325 to determine a current position of the headset 300 on the head 310. For example, if there are changes in positional information from the position sensor that are beyond a threshold value (e.g., user is running and headset is moving around on the head 310) the audio system may increase how often it samples images from one or both tracking cameras 320, 325 and how often it determines a position of the headset 300. For example, the audio system may increase from determining a position of the headset 300 once every few seconds to determining the position of the headset 300 multiple times a second. Likewise, if the positional information indicates movement below the threshold values (e.g., user is sitting looking out the window), then the audio system may decrease how often it samples images from one or both tracking cameras 320, 325 and how often it determines a position of the headset 300.

In some embodiments, the audio system determines whether to update the one or more acoustic values based on whether a difference between the updated position of the headset and the previous position of the headset is larger than one or more values of one or more thresholds. The one more thresholds may describe movement along various different degrees of freedom the headset 310 has on the head 310. For example, the thresholds may include a value for translation in X, a value for translation in Y, a value for translation in Z, a value for rotation about X, a value for rotation about Y, a value for a rotation about Z, or some combination thereof, relative to a coordinate system of the headset 300. The values of the or more thresholds may be based on, e.g., a minimum change in position that would cause an average user to discern differences in presented audio content. If the difference in position is less than the threshold value, then the audio system may continue to present audio content (and/or apply an ATF to sound captured from the microphone array) using the values of the acoustic parameters for the prior position of the headset (e.g., nominal position in FIG. 3A). However, if the difference in position is more than the threshold value, then the audio system may use the updated position of the headset and the headset acoustic model (or combined model) to determine updates for values of one or more acoustic parameters.

In some embodiments, the audio system determines updated values for one or more acoustic parameters based on a position of the headset 300 changing relative to the previously determined position of the headset 300, regardless of how large or small a difference the change in position is.

The audio system mitigates error in one or more acoustic parameters caused by variable positioning of the headset 300 on the head 310 of the user. This may be especially important if the audio system is presenting content to the user while the user is active in a manner (e.g., running, in the gym, playing a game, etc.) which may cause the headset 300 to move on the head 310. In contrast, conventional AR/VR/MR headsets do not take this into account, and accordingly, can be detrimental to the user experience.

Figure 3C:
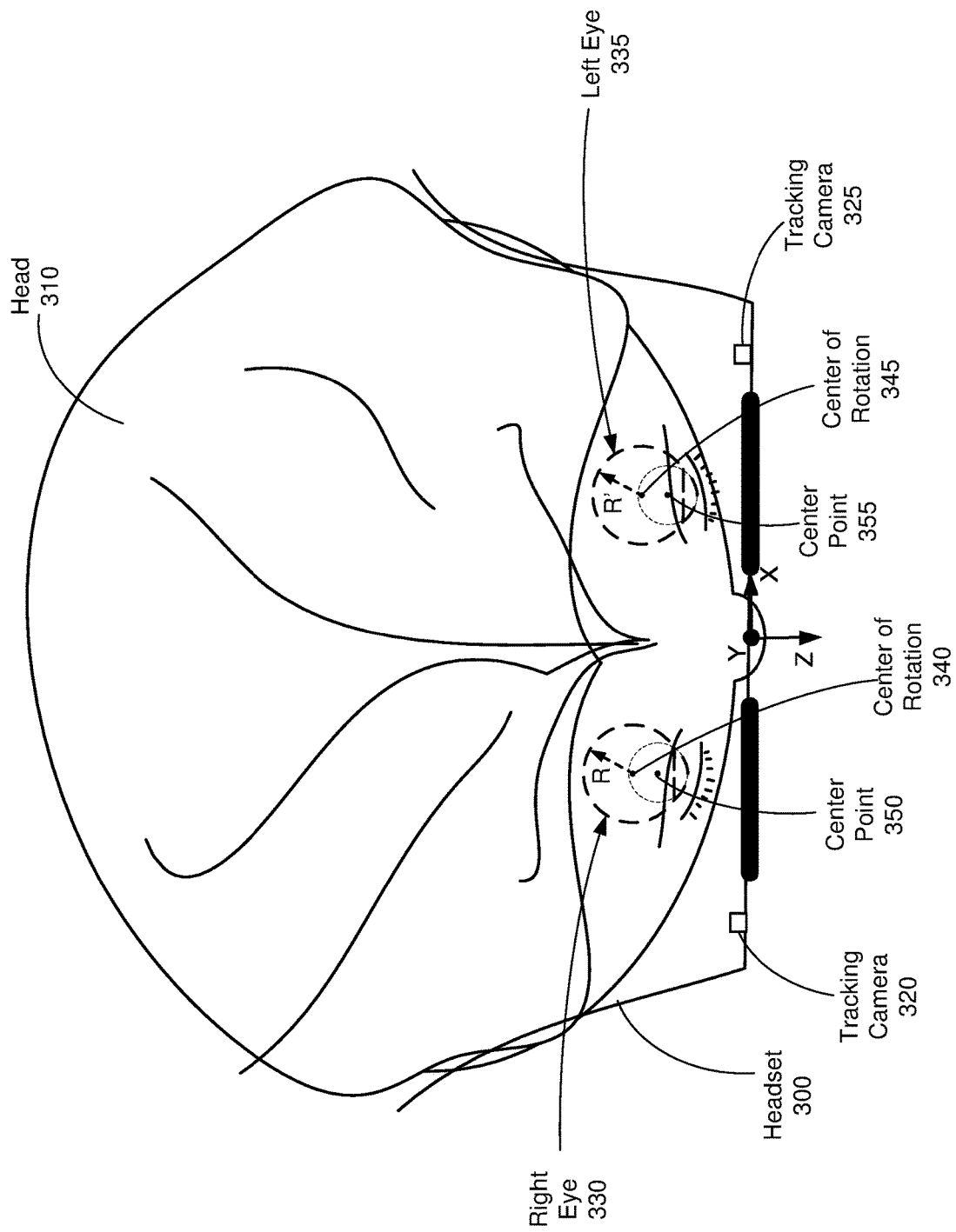
FIG. 3C is a top down view of the headset of FIG. 3A in the nominal position on the head of the user, in accordance with one or more embodiments.

FIG. 3C is a top down view of the headset of FIG. 3A in the nominal position on the head of the user, in accordance with one or more embodiments. The head 300 includes muscle, skin, etc., that is pliable/malleable such that portions of it may not be fixed. This can make it difficult to identify landmark features on the head 310, as the shape and/or position of the landmark features may change as, e.g., the user changes expression. One way to address this difficulty is to determine a center of rotation of one or both eyes, and use the identified center(s) of rotation to determine a position of the headset 300 relative to the head 310.

The user has a right eye 330 and a left eye 335. Each eye 330, 335 may be modeled using two spheres. The two spheres are a corneal sphere with a curvature matching a cornea of the eye, and an eyeball sphere that includes a center of rotation of the eye (i.e., a point at which the eye actually rotates about. Note that a center point of the corneal sphere is a fixed distance from the center of rotation of the eye. For example, as illustrated, the right eye 330 has a center of rotation 340, and the left eye as a center of rotation 345. Note that the centers of rotation 340, 345 are fixed with respect to the head—accordingly, their positions may be used to determine a position of the headset 300 relative to the head 310. The eyeball sphere for the right eye 330 corresponds to a sphere having a radius R and the center of rotation 340, and the eyeball sphere for the left eye 335 corresponds to a sphere having a radius R' and the center of rotation 345.

In some embodiments, the audio system identifies the right eye 330 in images from the tracking camera 320 as a landmark feature, and identifies the left eye 335 in images from the tracking camera 325 as a landmark feature. As described above with regard to FIG. 2, the identification of the right eye 330 and/or the left eye 335 may be done using a trained model.

The audio system uses a headset position model and the identified landmark features to determine a position of the headset 300 on the head 310. The headset position model may include a virtual model of the head 310 and a virtual model of the headset 300 on the virtual model of the head. And he virtual model of the head may include virtual models of one or both eyes. Each virtual model of the eye describing one or more features of an eye. Features may include, e.g., shape of an eye (e.g., corneal sphere, eyeball sphere), a center of rotation of an eye, a center point of a corneal sphere, a radius of a corneal sphere, a radius of an eyeball sphere, a distance from a center of rotation to a pupil, a foveal offset of the eye, other features of the eye, or some combination thereof. For example, the virtual model of the head may model a shape, a position, one or more other features, or some combination thereof, of the right eye 330 and/or the left eye 335. For example, the virtual model of each eye may model a shape of each eye such that each shape is described by a corneal sphere and an eyeball sphere. Note that movement of the headset 300 on the head 310 can result in differences in size and/or position of an eye in a captured image. Accordingly, in some embodiments, given an image of an eye, the headset position model determines a position of center point of a corneal sphere by adjusting the virtual model of the headset relative to the virtual model of the head such that a virtual camera would capture an image that corresponds to the captured image. And based on the locations of the center points (i.e., 350, 355) of one or both eyes, the audio system determines the corresponding positions of the centers of rotation (i.e., 340, 345).

In other embodiments, the centers of rotation are determined based on locations of pupils of the eyes in the images. A gaze axis may be estimated for an eye based in part on a pupil of the eye in the image. The audio system estimates a location of a center axis that is perpendicular to the pupil and passes through the center of the pupil, the center of rotation of the eye, and intersects a retina of the eye at an intersect location. Note that the center axis is not coincident with the actual line of sight of the eye, as a fovea of the eye is slightly offset from the intersect location of the center axis. The virtual model of the eye may be calibrated to include estimated positions of a center of rotation of an eye for various locations of a pupil of an eye in an image.

The audio system calibrates the virtual model of one or both eyes of each user. Various features of one or both eyes and or combinations of features can be unique to a particular user. Features may include, e.g., shape of an eye (e.g., corneal sphere, eyeball sphere), a center of rotation of an eye, a center point of a corneal sphere, a radius of a corneal sphere, a radius of an eyeball sphere, a distance from a center of rotation to a pupil, a foveal offset of the eye, other features of the eye, or some combination thereof. The audio system may calibrate the virtual model such that one or more features describe one or both eyes of the user. For example, the audio system may cause the headset to display virtual targets to the user at different locations within the local area, and capture images of one or both eyes while looking at the different targets. The virtual models of the eyes (e.g., radii of eyeball spheres, radii of corneal spheres, locations of centers of rotation, etc.) may then be updated to match the data collected at the various orientations, from which a center of rotation of each may be determined. In the above manner, the audio system can calibrate the virtual model to the specific eye anatomy of each user. Note several processes for determining a center of rotation of an eye are described above, however, other methods may be used.

The positions of the centers of rotation 340, 345 are fixed within the head 310. Additionally, the positions of the centers of the rotation 340, 345 are measured relative to the headset 300. Accordingly, by determining a location of one or both centers of rotation, the audio system is determining a position of a coordinate system of the headset relative to one or both eyes. In some embodiments, the audio system may apply a temporal filter to further smooth the locations of the centers of rotation of one or both eyes relative to the headset 300.

FIG. 4 is a flowchart illustrating a process for adjusting acoustic parameters based on headset position, in accordance with one or more embodiments. The process shown in FIG. 4 may be performed by components of an audio system (e.g., audio system 200). Other entities may perform some or all of the steps in FIG. 4 in other embodiments. Embodiments may include different and/or additional steps, or perform the steps in different orders.

The audio system 200 determines 410 a position of a headset based in part on an image of a portion of the head. The determined position of the headset is relative to a position of the head of a user wearing the headset. The audio system 200 may infer the position of the head from externally observable features (e.g., landmark features) in the image. The image is from a tracking camera (e.g., part of a face and/or eye tracking system) on the headset. The audio system 200 identifies one or more landmark features in the images (e.g., using a trained model). The audio system 200 may determine the position of the headset relative to the head using a headset position model (e.g., as described above with regard to FIGS. 2 and 3A-C.

The audio system 200 adjusts 420 one or more acoustic parameters based in part on the determined position. For example, the audio system 200 may use a headset acoustic model to determine values of the one or more acoustic parameters (e.g., EQ profile, HRTF of user, ATF of microphone array of headset, etc.) that correspond to the determined position of headset. The audio system 200 may then update the one or more acoustic parameters in accordance with the determined values.

The audio system 200 performs 430 an action that uses the adjusted one or more acoustic parameters. The action may be, e.g., presenting audio content using the adjusted one or more acoustic parameters. For example, the audio system 200 generates one or more sound filters based in part on the adjusted one or more acoustic parameters. The audio system 200 may apply the sound filters to audio content which is presented to the user (e.g., via a transducer array). In some embodiments, the adjusted acoustic parameter may be an adjusted ATF of the microphone array, and the action may be to apply the adjusted ATF to sound captured from the local area by the microphone array.

Figure 5:
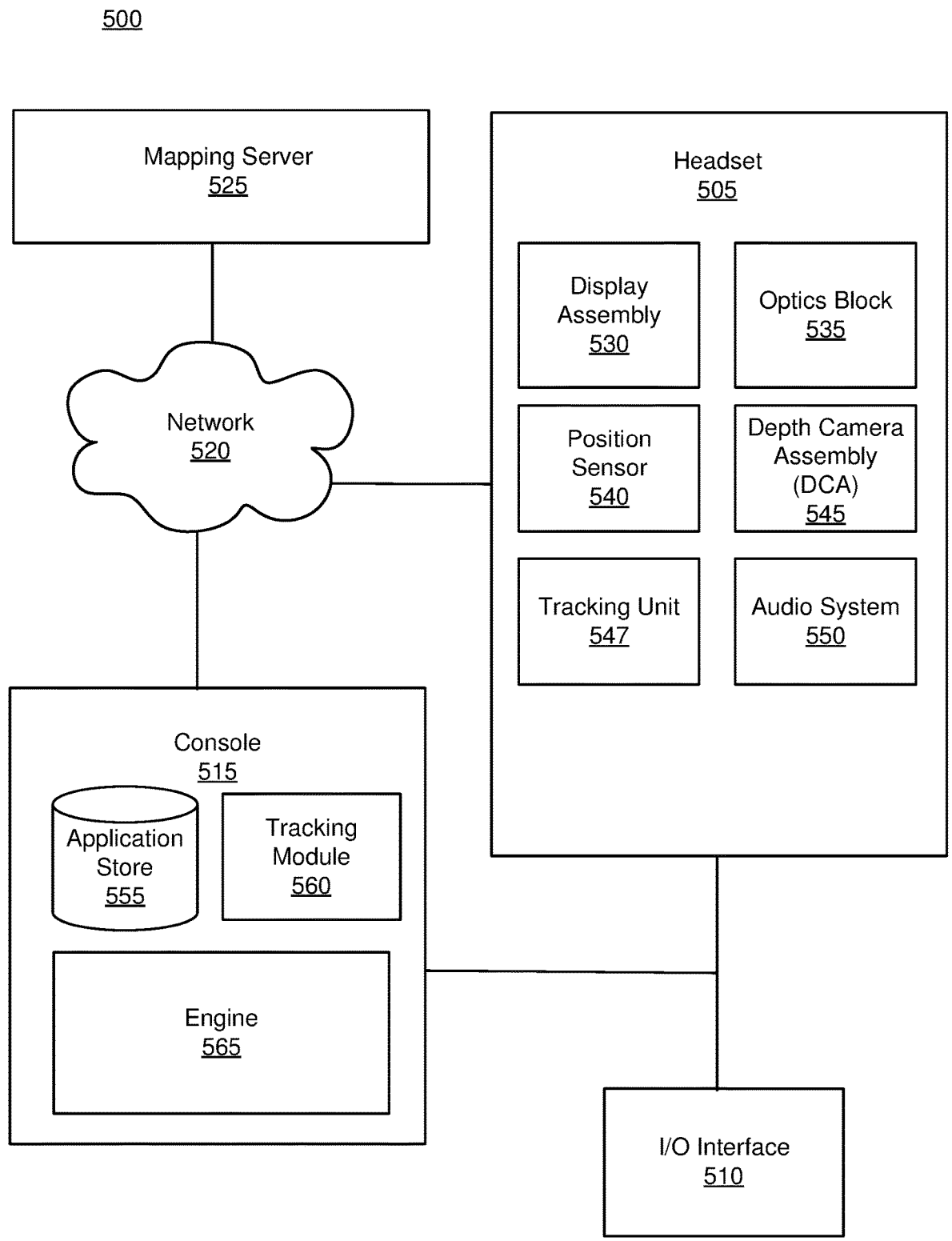
FIG. 5 is a system that includes a headset, in accordance with one or more embodiments.

FIG. 5 is a system 500 that includes a headset 505, in accordance with one or more embodiments. In some embodiments, the headset 505 may be the headset 100 of FIG. 1A or the headset 105 of FIG. 1B. The system 500 may operate in an artificial reality environment (e.g., a virtual reality environment, an augmented reality environment, a mixed reality environment, or some combination thereof). The system 500 shown by FIG. 5 includes the headset 505, an input/output (I/O) interface 510 that is coupled to a console 515, the network 520, and the mapping server 525. While FIG. 5 shows an example system 500 including one headset 505 and one I/O interface 510, in other embodiments any number of these components may be included in the system 500. For example, there may be multiple headsets each having an associated I/O interface 510, with each headset and I/O interface 510 communicating with the console 515. In alternative configurations, different and/or additional components may be included in the system 500. Additionally, functionality described in conjunction with one or more of the components shown in FIG. 5 may be distributed among the components in a different manner than described in conjunction with FIG. 5 in some embodiments. For example, some or all of the functionality of the console 515 may be provided by the headset 505.

The headset 505 includes the display assembly 530, an optics block 535, one or more position sensors 540, the DCA 545, a tracking unit 547, and the audio system 500. Some embodiments of headset 505 have different components than those described in conjunction with FIG. 5. Additionally, the functionality provided by various components described in conjunction with FIG. 5 may be differently distributed among the components of the headset 505 in other embodiments, or be captured in separate assemblies remote from the headset 505.

The display assembly 530 displays content to the user in accordance with data received from the console 515. The display assembly 530 displays the content using one or more display elements (e.g., the display elements 105). A display element may be, e.g., an electronic display. In various embodiments, the display assembly 530 comprises a single display element or multiple display elements (e.g., a display for each eye of a user). Examples of an electronic display include: a liquid crystal display (LCD), an organic light emitting diode (OLED) display, an active-matrix organic light-emitting diode display (AMOLED), a waveguide display, some other display, or some combination thereof. Note in some embodiments, the display element 105 may also include some or all of the functionality of the optics block 535.

The optics block 535 may magnify image light received from the electronic display, corrects optical errors associated with the image light, and presents the corrected image light to one or both eyeboxes of the headset 505. In various embodiments, the optics block 535 includes one or more optical elements. Example optical elements included in the optics block 535 include: an aperture, a Fresnel lens, a convex lens, a concave lens, a filter, a reflecting surface, or any other suitable optical element that affects image light. Moreover, the optics block 535 may include combinations of different optical elements. In some embodiments, one or more of the optical elements in the optics block 535 may have one or more coatings, such as partially reflective or anti-reflective coatings.

Magnification and focusing of the image light by the optics block 535 allows the electronic display to be physically smaller, weigh less, and consume less power than larger displays. Additionally, magnification may increase the field of view of the content presented by the electronic display. For example, the field of view of the displayed content is such that the displayed content is presented using almost all (e.g., approximately 110 degrees diagonal), and in some cases, all of the user's field of view. Additionally, in some embodiments, the amount of magnification may be adjusted by adding or removing optical elements.

In some embodiments, the optics block 535 may be designed to correct one or more types of optical error. Examples of optical error include barrel or pincushion distortion, longitudinal chromatic aberrations, or transverse chromatic aberrations. Other types of optical errors may further include spherical aberrations, chromatic aberrations, or errors due to the lens field curvature, astigmatisms, or any other type of optical error. In some embodiments, content provided to the electronic display for display is pre-distorted, and the optics block 535 corrects the distortion when it receives image light from the electronic display generated based on the content.

The position sensor 540 is an electronic device that generates data indicating a position of the headset 505. The position sensor 540 generates one or more measurement signals in response to motion of the headset 505. The position sensor 110 is an embodiment of the position sensor 540. Examples of a position sensor 540 include: one or more IMUS, one or more accelerometers, one or more gyroscopes, one or more magnetometers, another suitable type of sensor that detects motion, or some combination thereof. The position sensor 540 may include multiple accelerometers to measure translational motion (forward/back, up/down, left/right) and multiple gyroscopes to measure rotational motion (e.g., pitch, yaw, roll). In some embodiments, an IMU rapidly samples the measurement signals and calculates the estimated position of the headset 505 from the sampled data. For example, the IMU integrates the measurement signals received from the accelerometers over time to estimate a velocity vector and integrates the velocity vector over time to determine an estimated position of a reference point on the headset 505. The reference point is a point that may be used to describe the position of the headset 505. While the reference point may generally be defined as a point in space, however, in practice the reference point is defined as a point within the headset 505.

The DCA 545 generates depth information for a portion of the local area. The DCA includes one or more imaging devices and a DCA controller. The DCA 545 may also include an illuminator. Operation and structure of the DCA 545 is described above with regard to FIG. 1A.

The tracking unit 547 performs eye and/or facial tracking. The tracking unit 547 determines tracking information describing positions of the eyes and/or face. The tracking unit 547 includes one or more tracking cameras. The tracking unit may provide images captured by the one or more tracking cameras to the audio system 550. The tracking unit 547 is an embodiment of the tracking unit described above with reference to FIGS. 1A-C.

The audio system 550 provides audio content to a user of the headset 505. The audio system 550 is substantially the same as the audio system 200 describe above. The audio system 550 may comprise one or more acoustic sensors, one or more transducers, and an audio controller. The audio system 550 may provide spatialized audio content to the user. In some embodiments, the audio system 550 may request acoustic parameters from the mapping server 525 over the network 520. The acoustic parameters describe one or more acoustic properties (e.g., room impulse response, a reverberation time, a reverberation level, etc.) of the local area. The audio system 550 may provide information of electro-acoustic and mechanical characteristics of transducers (e.g., as described in FIG. 2) and/or acoustic sensors. The audio system 550 may provide information describing at least a portion of the local area from e.g., the DCA 545 and/or location information for the headset 505 from the position sensor 540 to the mapping server 525. The audio system 550 may generate one or more sound filters using one or more of the acoustic parameters received from the mapping server 525, and use the sound filters to provide audio content to the user.

The audio system 550 uses images from one or more tracking cameras to determine a position of the headset 505 on a head of a user wearing the headset 505. As described above with regard to, e.g., FIGS. 2-4, the audio system may use a trained model to identify landmark features in the images, and use a headset position model to determine a position of the headset based on the identified landmark features. The audio system 550 determines values (e.g., using a headset acoustic model) for one or more acoustic parameters based in part on the determined position. The audio system 550 adjusts one or more audio parameters based in part on the determine position. The audio system 550 then performs an action (e.g., presents audio content, captures sound from local area, etc.) that uses the adjusted one or more audio parameters. For example, the audio system 550 may generate sound filters based on the updated values of the one or more acoustic parameters, and present the audio content to the user using the generated sound filters. Likewise, in some embodiments, the adjusted acoustic parameter may be an adjusted ATF of the microphone array, and the action may be to apply the adjusted ATF to sound captured from the local area by the microphone array.

The I/O interface 510 is a device that allows a user to send action requests and receive responses from the console 515. An action request is a request to perform a particular action. For example, an action request may be an instruction to start or end capture of image or video data, or an instruction to perform a particular action within an application. The I/O interface 510 may include one or more input devices. Example input devices include: a keyboard, a mouse, a game controller, or any other suitable device for receiving action requests and communicating the action requests to the console 515. An action request received by the I/O interface 510 is communicated to the console 515, which performs an action corresponding to the action request. In some embodiments, the I/O interface 510 includes an IMU that captures calibration data indicating an estimated position of the I/O interface 510 relative to an initial position of the I/O interface 510. In some embodiments, the I/O interface 510 may provide haptic feedback to the user in accordance with instructions received from the console 515. For example, haptic feedback is provided when an action request is received, or the console 515 communicates instructions to the I/O interface 510 causing the I/O interface 510 to generate haptic feedback when the console 515 performs an action.

The console 515 provides content to the headset 505 for processing in accordance with information received from one or more of: the DCA 545, the headset 505, and the I/O interface 510. In the example shown in FIG. 5, the console 515 includes an application store 555, a tracking module 560, and an engine 565. Some embodiments of the console 515 have different modules or components than those described in conjunction with FIG. 5. Similarly, the functions further described below may be distributed among components of the console 515 in a different manner than described in conjunction with FIG. 5. In some embodiments, the functionality discussed herein with respect to the console 515 may be implemented in the headset 505, or a remote system.

The application store 555 stores one or more applications for execution by the console 515. An application is a group of instructions, that when executed by a processor, generates content for presentation to the user. Content generated by an application may be in response to inputs received from the user via movement of the headset 505 or the I/O interface 510. Examples of applications include: gaming applications, conferencing applications, video playback applications, or other suitable applications.

The tracking module 560 tracks movements of the headset 505 or of the I/O interface 510 using information from the DCA 545, the one or more position sensors 540, or some combination thereof. For example, the tracking module 560 determines a position of a reference point of the headset 505 in a mapping of a local area based on information from the headset 505. The tracking module 560 may also determine positions of an object or virtual object. Additionally, in some embodiments, the tracking module 560 may use portions of data indicating a position of the headset 505 from the position sensor 540 as well as representations of the local area from the DCA 545 to predict a future location of the headset 505. The tracking module 560 provides the estimated or predicted future position of the headset 505 or the I/O interface 510 to the engine 565.

The engine 565 executes applications and receives position information, acceleration information, velocity information, predicted future positions, or some combination thereof, of the headset 505 from the tracking module 560. Based on the received information, the engine 565 determines content to provide to the headset 505 for presentation to the user. For example, if the received information indicates that the user has looked to the left, the engine 565 generates content for the headset 505 that mirrors the user's movement in a virtual local area or in a local area augmenting the local area with additional content. Additionally, the engine 565 performs an action within an application executing on the console 515 in response to an action request received from the I/O interface 510 and provides feedback to the user that the action was performed. The provided feedback may be visual or audible feedback via the headset 505 or haptic feedback via the I/O interface 510.

The network 520 couples the headset 505 and/or the console 515 to the mapping server 525. The network 520 may include any combination of local area and/or wide area networks using both wireless and/or wired communication systems. For example, the network 520 may include the Internet, as well as mobile telephone networks. In one embodiment, the network 520 uses standard communications technologies and/or protocols. Hence, the network 520 may include links using technologies such as Ethernet, 802.11, worldwide interoperability for microwave access (WiMAX), 2G/3G/4G mobile communications protocols, digital subscriber line (DSL), asynchronous transfer mode (ATM), InfiniBand, PCI Express Advanced Switching, etc. Similarly, the networking protocols used on the network 520 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 520 can be represented using technologies and/or formats including image data in binary form (e.g. Portable Network Graphics (PNG)), hypertext markup language (HTML), extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc.

The mapping server 525 may include a database that stores a virtual model describing a plurality of spaces, wherein one location in the virtual model corresponds to a current configuration of a local area of the headset 505. The mapping server 525 receives, from the headset 505 via the network 520, information describing at least a portion of the local area and/or location information for the local area. The user may adjust privacy settings to allow or prevent the headset 505 from transmitting information to the mapping server 525. The mapping server 525 determines, based on the received information and/or location information, a location in the virtual model that is associated with the local area of the headset 505. The mapping server 525 determines (e.g., retrieves) one or more acoustic parameters associated with the local area, based in part on the determined location in the virtual model and any acoustic parameters associated with the determined location. The mapping server 525 may transmit the location of the local area and any values of acoustic parameters associated with the local area to the headset 505.

One or more components of system 500 may contain a privacy module that stores one or more privacy settings for user data elements. The user data elements describe the user or the headset 505. For example, the user data elements may describe a physical characteristic of the user, an action performed by the user, a location of the user of the headset 505, a location of the headset 505, an HRTF for the user, etc. Privacy settings (or "access settings") for a user data element may be stored in any suitable manner, such as, for example, in association with the user data element, in an index on an authorization server, in another suitable manner, or any suitable combination thereof.

A privacy setting for a user data element specifies how the user data element (or particular information associated with the user data element) can be accessed, stored, or otherwise used (e.g., viewed, shared, modified, copied, executed, surfaced, or identified). In some embodiments, the privacy settings for a user data element may specify a "blocked list" of entities that may not access certain information associated with the user data element. The privacy settings associated with the user data element may specify any suitable granularity of permitted access or denial of access. For example, some entities may have permission to see that a specific user data element exists, some entities may have permission to view the content of the specific user data element, and some entities may have permission to modify the specific user data element. The privacy settings may allow the user to allow other entities to access or store user data elements for a finite period of time.

The privacy settings may allow a user to specify one or more geographic locations from which user data elements can be accessed. Access or denial of access to the user data elements may depend on the geographic location of an entity who is attempting to access the user data elements. For example, the user may allow access to a user data element and specify that the user data element is accessible to an entity only while the user is in a particular location. If the user leaves the particular location, the user data element may no longer be accessible to the entity. As another example, the user may specify that a user data element is accessible only to entities within a threshold distance from the user, such as another user of a headset within the same local area as the user. If the user subsequently changes location, the entity with access to the user data element may lose access, while a new group of entities may gain access as they come within the threshold distance of the user.

The system 500 may include one or more authorization/privacy servers for enforcing privacy settings. A request from an entity for a particular user data element may identify the entity associated with the request and the user data element may be sent only to the entity if the authorization server determines that the entity is authorized to access the user data element based on the privacy settings associated with the user data element. If the requesting entity is not authorized to access the user data element, the authorization server may prevent the requested user data element from being retrieved or may prevent the requested user data element from being sent to the entity. Although this disclosure describes enforcing privacy settings in a particular manner, this disclosure contemplates enforcing privacy settings in any suitable manner.

Additional Configuration Information

The foregoing description of the embodiments has been presented for illustration; it is not intended to be exhaustive or to limit the patent rights to the precise forms disclosed. Persons skilled in the relevant art can appreciate that many modifications and variations are possible considering the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method comprising:
   determining a position of a headset relative to a position of a head of a user wearing the headset, the determining based in part on an image of a portion of the head from a tracking camera on the headset;
   adjusting an acoustic parameter based in part on the determined position of the headset; and
   performing an action that uses the adjusted acoustic parameter.

2. The method of claim 1, further comprising:
   determining that the position of the headset is more than a threshold value from a prior position of the headset, and
   wherein adjusting the parameter is based in part on the determined position of the headset being more than the threshold value.

3. The method of claim 1, further comprising:
   inferring the position of the head from externally observable features in the image.

4. The method of claim 1, wherein the acoustic parameter is at least one of: an equalization profile for the user, a head-related transfer function for the user, and an array transfer function of a microphone array of the headset.

5. The method of claim 1, wherein determining the position of the headset relative to the position of the head based in part on the image, further comprises:
   identifying a landmark feature of the head based in part on the image; and
   determining a position of a coordinate system of the headset relative to landmark feature.

6. The method of claim 5, wherein the landmark feature is an anatomical feature of the head.

7. The method of claim 6, wherein the anatomical feature of the head is an eye, and determining the position of the coordinate system of the headset relative to landmark feature, further comprises:
   determining a position of a center of rotation the eye based in part on the image; and determining the position of the coordinate system relative to the position of the center of rotation of the eye.

8. The method of claim 1, wherein the image is of a portion of the head, and determining the position of the headset relative to the position of the head based in part on the image, is further based in part on a second image of head from a different perspective than the image, and the second image also includes the portion of the head.

9. The method of claim 1, wherein adjusting the acoustic parameter based in part on the determined position of the headset, comprises:
adjusting the acoustic parameter to offset error introduced by the headset changing position from a prior position to the determined position.

10. The method of claim 1, wherein the acoustic parameter is an array transfer function of a microphone array of the headset, and performing the action that uses the adjusted acoustic parameter comprises:
capturing sound from a local area using the microphone array; and
adjusting the array transfer function based on the determined position.

11. The method of claim 1, wherein performing the action that uses the adjusted acoustic parameter, comprises:
presenting audio content in accordance with the adjusted acoustic parameter.

12. An audio system of a headset comprising:
an audio controller configured to:
determine a position of the headset relative to a position of a head of a user wearing the headset based in part on an image of a portion of the head from a tracking camera on the headset;
adjust an acoustic parameter based in part on the determined position of the headset; and
a speaker array configured to present audio content in accordance with the adjusted acoustic parameter.

13. The audio system of claim 12, wherein the audio controller is further configured to:
determine that the position of the headset is more than a threshold value from a baseline position of the headset, and
adjust the acoustic parameter based in part on the determined position of the headset being more than the threshold value.

14. The audio system of claim 12, wherein the acoustic parameter is at least one of:
an equalization profile for the user, a head-related transfer function for the user, and array transfer function of a microphone array of the headset.

15. The audio system of claim 12, wherein the audio controller is further configured to:
identify a landmark feature of the head based in part on the image; and
determine a position of a coordinate system of the headset relative to landmark feature.

16. The audio system of claim 15, wherein the landmark feature is an eye, and the audio controller is further configured to:
determine a position of a center of rotation the eye based in part on the image; and
determine the position of the coordinate system relative to the position of the center of rotation of the eye.

17. The audio system of claim 12, wherein the image is of a portion of the head, and the audio controller is further configured to:
determine the position of the headset relative to the position of the head based in part on a second image of the head, the second image having a different perspective than the image, and the second image also including the portion of the head.

18. The audio system of claim 12, wherein the audio controller is further configured to:
adjust the acoustic parameter to offset error introduced by the headset changing position from a prior position to the determined position.

19. The audio system of claim 12, further comprising:
a microphone array configured to capture sound from a local area; and
wherein an acoustic parameter is an array transfer function of the microphone array, and the audio controller is further configured to adjust the array transfer function based on the determined position.

20. A non-transitory computer readable medium configured to store program code instructions, when executed by a processor, cause the processor to perform steps comprising:
determining a position of a headset relative to a position of a head of a user wearing the headset, the determining based in part on an image of a portion of the head from a tracking camera on the headset;
adjusting an acoustic parameter based in part on the determined position of the headset; and
performing an action that uses the adjusted acoustic parameter.

* * * * *